United States Patent
Favero et al.

(10) Patent No.: US 11,787,889 B2
(45) Date of Patent: Oct. 17, 2023

(54) PROCESS FOR THE PREPARATION OF POLYACRYLAMIDES USING AN ECO-FRIENDLY LUBRICANT COMPOSITION

(71) Applicant: SNF GROUP, Andrezieux Boutheon (FR)

(72) Inventors: Cédrick Favero, Andrezieux Boutheon (FR); Thierry Bessenet, Andrezieux Boutheon (FR); Frédéric Daguerre, Andrezieux Boutheon (FR); Jing Ling, Taixing (CN); Nicolas Boisse, Taixing (CN)

(73) Assignee: SNF GROUP, Andrezieux Boutheon (FR)

( * ) Notice: Subject to any disclaimer, the term of this patent is extended or adjusted under 35 U.S.C. 154(b) by 0 days.

(21) Appl. No.: 17/906,941

(22) PCT Filed: Mar. 23, 2021

(86) PCT No.: PCT/EP2021/057479
§ 371 (c)(1),
(2) Date: Sep. 21, 2022

(87) PCT Pub. No.: WO2021/197938
PCT Pub. Date: Oct. 7, 2021

(65) Prior Publication Data
US 2023/0114065 A1 Apr. 13, 2023

(30) Foreign Application Priority Data
Apr. 1, 2020 (CN) .......................... 202010251862.7

(51) Int. Cl.
| C08F 220/56 | (2006.01) |
| C10M 167/00 | (2006.01) |
| C08J 3/12 | (2006.01) |
| C10M 105/34 | (2006.01) |
| C10M 105/40 | (2006.01) |
| C10M 107/48 | (2006.01) |
| C10M 111/04 | (2006.01) |

(52) U.S. Cl.
CPC ............. *C08F 220/56* (2013.01); *C08J 3/122* (2013.01); *C10M 105/34* (2013.01); *C10M 105/40* (2013.01); *C10M 107/48* (2013.01); *C10M 111/04* (2013.01); C08J 2333/26 (2013.01); C10M 2207/2815 (2013.01); C10M 2207/2835 (2013.01); C10M 2225/0405 (2013.01)

(58) Field of Classification Search
CPC ........ C08F 2/004; C08J 3/124; C10M 167/00; C10M 107/48
See application file for complete search history.

(56) References Cited

U.S. PATENT DOCUMENTS
2016/0024332 A1  1/2016  Loick et al.

FOREIGN PATENT DOCUMENTS
EP  2348089 A1  7/2011

OTHER PUBLICATIONS

International Search Report and Written Opinion of International Application No. PCT/EP2021/057479 dated Jul. 15, 2021, 13 pages.

*Primary Examiner* — Catherine S Branch
(74) *Attorney, Agent, or Firm* — Heslin Rothenberg Farley & Mesiti P.C.

(57) ABSTRACT

Process for preparing water-soluble polymers in powder form by polymerization of water-soluble monoethylenically unsaturated monomers comprising the successive steps:
a) Spraying on the inner wall of a polymerization vessel, the lubricant composition LC1: alkyl oleate/polyoxyethylene oleyl ether phosphate/sorbitan monolaurate,
b) Polymerizing in aqueous solution in the presence of polymerization initiators at least one water-soluble monounsaturated ethylenic monomer,
c) Discharging the polymer gel,
d) Granulating the polymer gel thus obtained in a granulator, in presence of a lubricant composition LC2: alkyl oleate/polyoxyethylene oleyl ether phosphate/sorbitan monolaurate,
e) Drying the polymer gel to obtain a polymer in powder form,
f) Grinding and sifting the powder.

20 Claims, No Drawings

PROCESS FOR THE PREPARATION OF POLYACRYLAMIDES USING AN ECO-FRIENDLY LUBRICANT COMPOSITION

CROSS REFERENCE TO RELATED APPLICATIONS

This application is a national stage filing under section 371 of International Application No. PCT/EP2021/057479, filed on Mar. 23, 2021, and published on Oct. 7, 2021 as WO 2021/197938 A1, which claims priority to Chinese Application No. 202010251862.7, filed on Apr. 1, 2020. The entire contents of WO 2021/197938 A1 are hereby incorporated herein by reference.

TECHNICAL FILED

The invention relates to a process for preparing water-soluble polymers in powder form by polymerization of water-soluble monoethylenically unsaturated monomers in aqueous solution using an eco-friendly lubricant composition during polymerization, and granulation steps.

BACKGROUND TECHNIQUE

The solution polymerization of polar monomers, e.g. acrylic acid, acrylamide or their derivatives leads in aqueous solution, even at relatively low monomer concentrations, for example below 10 percent, to sticky elastic gel-like products relatively quickly, both without and with crosslinking agents. The sticky gel is formed in a mostly radical-initiated reaction course, which poses problems during its reaction vessel discharge and also during subsequent granulation step.

To avoid adherence of the sticky gel-like product on the inner wall of the reaction vessel and so to improve discharge of the product from the reaction vessel, a lubricant can be distributed between the reaction vessel inner wall and polymer phase during the course of the polymerization.

For an efficient granulation of the sticky gel-like polymer after its discharge of the reaction vessel, lubricant is also often used.

On account of the heat of polymerization released, the temperature of reaction mixture rises more than 100° C. So, lubricant is heated during polymerization and even during discharge and granulation of the hot gel-like polymer. High temperature of the lubricant induces emission of its volatile organic compounds (VOC) and can also induce degradation of the lubricant with a potential decrease of its efficiency.

SUMMARY OF THE INVENTION

So, there's a need of an efficient, stable and low VOC eco-friendly lubricant composition for preparing water-soluble polymers in powder form.

So, the present invention relates a process for preparing water-soluble polymers in powder form by polymerization of water-soluble monoethylenically unsaturated monomers comprising the successive steps:
a) Spraying on the inner wall of a polymerization vessel, the lubricant composition LC1: alkyl oleate (25-40 weight %)/polyoxyethylene oleyl ether phosphate (50-65 weight %)/sorbitan monolaurate (5-15 weight %),
b) Polymerizing in aqueous solution in the polymerization vessel in the presence of polymerization initiators at an initiation temperature between −20° C. and 50° C., at least one water-soluble monounsaturated ethylenic monomer, the total mass concentration of monomer relative to the polymerization charge being between 10 and 60%,
c) Discharging the polymer gel from the polymerization vessel,
d) Granulating the polymer gel thus obtained in a granulator, in presence of a lubricant composition LC2: alkyl oleate (15-35 weight %)/polyoxoyethylene oleyl ether phosphate (15-45 weight %)/sorbitan monolaurate (35-55 weight %),
e) Drying the polymer gel to obtain a polymer in powder form,
f) Grinding and sifting the powder As used herein, the term "water-soluble polymer" refers to a polymer which gives an aqueous solution without insoluble particles when it is added under agitation during 4 hours at 25° C. at a concentration of 20 $g \cdot L^{-1}$. The same applies to water-soluble monounsaturated ethylenic monomers.

Polymers obtained by the process of the invention have preferably an average molecular weight by weight comprised between 0.1 and 30 million $g \cdot mol^{-1}$.

Preferably water-soluble monoethylenically unsaturated monomers used in step b) of the process are nonionic and/or anionic and/or cationic Non-ionic monomers are selected from the group comprising acrylamide; methacrylamide; N-mono derivatives of acrylamide; N-mono derivatives of methacrylamide; N,N derivatives of acrylamide; N,N derivatives of methacrylamide; acrylic esters; and methacrylic esters, preferably acrylamide.

Anionic monomers are selected from the group comprising monomers having a carboxylic function and salts thereof including acrylic acid, methacrylic acid, itaconic acid; maleic acid, monomers having a sulfonic acid function and salts thereof; including acrylamide tertio butyl sulfonic acid (ATBS), monomers having a phosphonic acid function and salts thereof, preferably: acrylic acid, acrylamide tertio butyl sulfonic acid. The most preferred anionic monomers are acrylic acid, acrylamide tertio butyl sulfonic acid (ATBS), and alkaline or alkaline earth or ammonium salts thereof.

It is necessary to note that -carboxylic function may not only be obtained by copolymerizing monomers comprising carboxylic moiety but also by hydrolyzing derivatives of —COOH groups after polymerization. For example, amide groups —CO—$NH_2$ of acrylamide may hydrolyze thus yielding —COOH groups.

Cationic monomers are selected from the group comprising dimethylaminoethyl acrylate (DMAEA) quaternized or salified; dimethylaminoethyl methacrylate (DMAEMA) quaternized or salified; diallyldimethyl ammonium chloride (DADMAC); acrylamidopropyltrimethylammonium chloride (APTAC); methacrylamidopropyltrimethylammonium chloride (MAPTAC).

The polymerization in step b) of the process of the invention is performed by free radicals using UV, azo, redox or thermal initiators as well as controlled radical polymerization techniques (CRP) or more particularly of RAFT type (Reversible Addition Fragmentation Chain Transfer) The polymerization charge corresponds to the solution of water-soluble monounsaturated ethylenic monomers optionally added to the usual polymerization regulators before the start of the polymerization, including the initiators. The polymerization charge generally contains all the reactants necessary to the polymerization, excluding LC1 and LC2. The usual polymerization regulators are for example sulfur compounds such as thioglycolic acid, mercapto alcohols, dodecyl mercaptan, amines such as ethanolamine, diethanolamine, morpholine and phosphites such as sodium hypophosphites. In the case of a RAFT type polymerization, specific polymerization regulators such as those comprising a transfer group comprising the —S—CS— function can be used. These compounds from the family of xanthates (—S—CS—O—), dithioesters —S—CS-Carbon), trithiocarbonates (—S—CS—S—), or dithiocarbamates (—S—CS-nitrogen). Among the compounds of the xanthat family, O-ethyl-S-(1-methoxy carbonyl ethyl) xanthate is widely used for its compatibility with monomers of acrylic nature.

The polymerization initiators used can be any of the compounds which dissociate into radicals under the polymerization conditions, for example: organic peroxides, hydroperoxides, hydrogen peroxide, persulfates, azo compounds and redox catalysts. The use of water-soluble initiators is preferred. In some cases, it is advantageous to use mixtures of various polymerization initiators, for example mixtures of redox catalysts and azo compounds.

Suitable organic peroxides and hydroperoxides are, for example, sodium or potassium peroxodisulfate, acetylacetone peroxide, methyl ethyl ketone, tert-butyl hydroperoxide, cumene hydroperoxide, tert-amyl perpivalate, tert-butyl perpivalate, tert-butyl perneohexanoate, tert-butyl perbutobutylate, -ethylhexanoate, tert-butyl perisononanoate, tert-butyl permaleate, tert-butyl perbenzoate, per-3,5, Tert-butyl 5-trimethylhexanoate and tert-amyl perneodecanoate. Suitable persulfates can be chosen from alkali metal persulfates such as sodium persulfate.

The suitable azo initiators are advantageously soluble in water and chosen from the following list: 2,2'-azobis-(2-amidinopropane) dihydrochloride, 2,2'-azobis (N, N'-dimethylene) dihydrochloride isobutyramidine, 2-(azo (1-cyano-1-methylethyl))-2-methylpropane nitrile, 2,2'-azobis [2-(2'-dimidazoline-2-yl) propane] dihydrochloride and acid 4,4'-azobis (4-cyanovaleric acid). Said polymerization initiators are used in usual amounts, for example in amounts from 0.001 to 2%, preferably from 0.01 to 1% by weight, relative to the monomers to be polymerized.

As an oxidizing component, the redox catalysts contain at least one of the abovementioned compounds and, as reducing component, for example ascorbic acid, glucose, sorbose, hydrogen sulfite, sulfite, thiosulfate, 1 hyposulfite, pyrosulfite or an alkali metal, metal salts, such as in the form of iron (II) ions or silver ions or sodium hydroxymethylsulfoxylate. The reducing component of the redox catalyst preferably used is the Mohr salt $(NH_4)$ $2Fe$ $(SO_4)$ $2.6$ $H_2O$. Based on the amount of monomers used in the polymerization, from $5\times10^{-6}$ to 1 mole % of the reducing component of the redox catalyst system and from $5\times10^{-5}$ to 2 mole % of the oxidizing component of the redox catalyst are used. Instead of the oxidizing component of the redox catalyst, one or more water-soluble azo initiators can also be used.

For step b) of the process of the invention, the total mass concentration of water-soluble monounsaturated ethylenic monomers relative to the polymerization charge is between 10 and 60%, advantageously between 20 and 55% and even more advantageously between 25 and 50%.

For step b) of this process, the monomers and the various polymerization additives (regulators, initiators) are dissolved, for example, in vessels with stirring in the aqueous medium to be polymerized. This solution, also called polymerization charge, is adjusted to an initiation temperature between −20° C. to 50° C. Advantageously this initiation temperature is adjusted between −5° C. and 30° C.

In order to remove the residual oxygen from the polymerization charge, an inert gas is usually passed through it. The inert gases suitable for this purpose are, for example, nitrogen, carbon dioxide or rare gases such as neon or helium. The polymerization is carried out in the absence of oxygen, by introducing the initiators in the appropriate order, known to the skilled person, in the solution to be polymerized. The initiators are introduced either in the form soluble in an aqueous medium, or if desired in the form of a solution in an organic solvent.

The polymerization can be carried out batchwise or continuously. In a batch procedure, the polymerization vessel (reactor) is filled with a solution of monomers and then with a solution of the initiator. As soon as the polymerization begins, the reaction mixture heats up according to the starting conditions chosen, such as the concentration of the monomers in the aqueous solution and the nature of the monomers. Due to the heat of polymerization released, the temperature of the reaction mixture rises for example from 30 to 180° C., preferably from 40° C. to 130° C. The polymerization can be carried out at normal pressure, under reduced pressure or even at high pressure. Working at high pressure can be advantageous in cases where the maximum temperature expected in the polymerization is higher than the boiling point of the solvent mixture used. On the other hand, it may be advantageous, when preparing products of very high molecular weight, to lower the maximum temperature by means of cooling with a cooling fluid. The reactor is in most cases clad so that the reaction mixture can be cooled or heated as required. Once the polymerization reaction has ended, the polymer gel obtained can be rapidly cooled, for example by cooling the wall of the reactor.

At the end of the reaction, the product resulting from the polymerization is a hydrated gel so viscous that it supports itself (thus a cube of gel of 2.5 cm on the side substantially maintains its shape when placed on a flat surface). The gel thus obtained is a viscoelastic gel.

Note that when the reaction is carried out in a reactor, in order to facilitate the discharge of the gel at the end of the reaction (step c)), the reactor is advantageously in inverted conical tubular form (cone down) in order to discharge the gel down by application of an inert gas or air pressure on the surface of the gel or in the form of a tilting in order to discharge the mass of gel by tilting the reactor.

Granulation consists of cutting the gel into small pieces. Advantageously, the average size of these pieces of gel is less than 1 cm, more advantageously it is between 4 and 8 mm. Those skilled in the art will know how to optimize granulation.

Advantageously, for steps a) of the process of the invention, the lubricant composition LC1 is sprayed on the inner wall of the polymerization vessel by means of at least one pig tail sprayer. Advantageously, for steps d) of the process of the invention, the lubricant composition LC2 is sprayed on the polymer in the cutting chamber of the granulator by means of at least one atomization nozzle or an ultrasonic nozzle.

Preferably the alkyloleate of lubricant compositions LC1 and/or LC2, is selected form the group: propyl oleate; isopropyl oleate, butyl oleate, isobutyl oleate, amyl oleate, hexyl oleate, ethylhexyl oleate, octyl oleate.

The polyoxyethylene group of the polyxoyethylene oleyl ether phosphate of lubricant compositions LC1 and/or LC2, contains preferably between 2 and 50 oxyethylene moieties.

Preferably 0.01 to 0.8 weight % of the lubricant composition LC1 is sprayed on the inner wall of the polymerization vessel based on the weight of the polymerization charge.

Preferably 0.01 to 1.2 weight % of the lubricant composition LC2 based on the weight of the polymerization charge is sprayed on the polymer in the cutting chamber of the granulator.

Step e) of the process consists in drying the polymer. The drying medium is a routine choice for those skilled in the art. Industrially, the drying is advantageously carried out by a fluidized bed or rotor dryer, using air heated to a temperature between 70° C. and 200° C. The air temperature is a function of the nature of the product as well as the drying time applied. After drying, the water-soluble polymer is physically in powder form.

For step f) of the process, the powder is ground and sieved. The grinding step consists of breaking the large particles of polymer into smaller particles. This can be done by shearing or mechanical crushing of the particle between two hard surfaces. Different types of equipment known to those skilled in the art can be used for this purpose. Examples include rotor mills, where the particle is crushed using the rotating part on a compression blade or else the roller mill, where the particle is crushed between two rotating cylinders. The purpose of sieving is then to remove, depending on the specifications, medium-sized particles that are too small or too large.

A last aspect of the invention is the use of water-soluble polymers in powder form obtained by the precedingly described process for oil and gas industry, hydraulic fracturing, paper making processes, water treatment, sludge dewatering, construction, mining, cosmetics, agriculture, industry textile and detergency.

The following examples are provided to illustrate the present invention. The examples are not intended to limit the scope of the invention.

EXAMPLES

CE1 & CE2: Preparation of an Anionic and Cationic Polyacrylamide in Powder Form
LC1: Hydrocarbons, C16-C20, n-alkanes, isoalkanes, cyclics/polyoxyethylene 10 oleyl ether phosphate/sorbitan monolaurate, (30/60/10, weight %)
LC2: Hydrocarbons, C16-C20, n-alkanes, isoalkanes, cyclics/polyoxyethylene 10 oleyl ether phosphate/sorbitan monolaurate, (50/06/44, weight %)
Anionic Polymer (CE1):

In a in inverted conical tubular reactor (capacity: 7.5 T), the polymerization charge was composed by 3137 kg of acrylamide (50 weight % in water) 757 kg of acrylic acid (90% in water) 757 kg of NaOH (50% in water) and 2849 kg of water.

Before polymerization, 10 L of lubricant composition LC1 is sprayed by a pig tail sprayer on the inner wall of the reactor.

After polymerization, the gel of polymer was discharged from the reactor, and granulated in a presence of 16 L·h$^{-1}$ of lubricant composition LC2 sprayed by one atomizer nozzle.
Cationic Polymer (CE2):

In a in inverted conical tubular reactor (capacity: 7.5 T), the polymerization charge was composed by 1593 kg of acrylamide (50 weight % in water) 3317 kg of dimethylaminoethyl acrylate (DMAEA) quaternized with methyl chloride (80% in water) and 2590 kg of water. Before polymerization, 20 L of lubricant composition LC1 is sprayed by a pig tail sprayer on the inner wall of the reactor.

After polymerization, the gel of polymer was discharged from the reactor, and granulated in a presence of 8 L·h$^{-1}$ of lubricant composition LC2 sprayed by one atomizer nozzle.

E1 & E2: Preparation of an Anionic and Cationic Polyacrylamide in Powder Form with Low VOC Lubricant Composition
LC1: ethylhexyl oleate/polyoxyethylene 10 oleyl ether phosphate/sorbitan monolaurate, (30/60/10, weight %)
LC2: ethylhexyl oleate/polyoxyethylene 10 oleyl ether phosphate/sorbitan monolaurate, (25/30/45, weight %)

For E1 (anionic polymer) and E2 (cationic polymer), same reactor and polymerization charge than respectively CE1 & CE2 were used.
Anionic Polymer (E1):

Before polymerization, 5 L of lubricant composition LC1 is sprayed by a pig tail sprayer on the inner wall of the reactor.

After polymerization, the gel of polymer was discharged from the reactor, and granulated in a presence of 11 L·h$^{-1}$ of lubricant composition LC2 sprayed by one atomizer nozzle.
Cationic Polymer (E2):

Before polymerization, 10 L of lubricant composition LC1 is sprayed by a pig tail sprayer on the inner wall of the reactor.

After polymerization, the gel of polymer was discharged from the reactor, and granulated in a presence of 4.6 L·h$^{-1}$ of lubricant composition LC2 sprayed by one atomizer nozzle.
COVs Measure:

COV measure was performed by a Flame Ionization Detector (FID) according to NFX 43 301 standard.
E1: 18 mg. Nm$^{-3}$; E2: 22 mg·Nm$^{-3}$
CE1: 42 mg. Nm$^{-3}$; CE2 50 mg·Nm$^{-3}$ Conclusion: Comparatively for E1 and E2/CE1 and CE2, quantity of lubricant LC1 and LC2 were decreased with less COVs emission.

The invention claimed is:

1. A process for preparing water-soluble polymers in powder form by polymerization of water-soluble monoethylenically unsaturated monomers comprising the successive steps:
   a) spraying on the inner wall of the polymerization vessel the lubricant composition LC1 comprising: 25-40 weight % alkyl oleate/50-65 weight % polyoxyethylene oleyl ether phosphate/and 5-15 weight % sorbitan monolaurate,
   b) polymerizing in aqueous solution, in the polymerization vessel, in the presence of polymerization initiators at an initiation temperature between −20° C. and 50° C., at least one water-soluble monounsaturated ethylenic monomer, the total mass concentration of monomer relative to the polymerization charge being between 10 and 60%,
   c) discharging the polymer gel from the polymerization vessel,
   d) granulating the polymer gel thus obtained in a granulator, in presence of a lubricant composition LC2 comprising: 15-35 weight % alkyl oleate/15-45 weight % polyoxyethylene oleyl ether phosphate/35-55 weight % sorbitan monolaurate,
   e) drying the polymer gel to obtain a polymer in powder form, and
   f) grinding and sifting the powder.

2. The process for preparing water-soluble polymers in powder form according to claim 1 wherein water-soluble monoethylenically unsaturated monomers are nonionic and/or anionic and/or cationic:
   non-ionic monomers are selected from the group consisting of acrylamide; methacrylamide; N-mono derivatives of acrylamide; N-mono derivatives of methacrylamide; N,N derivatives of acrylamide; N,N derivatives of methacrylamide; acrylic esters; and methacrylic esters, anionic monomers are selected from the group consisting of monomers having a carboxylic function and salts thereof including acrylic acid, methacrylic acid, itaconic acid; maleic acid, monomers having a sulfonic acid function and salts thereof; including acrylamide tertio butyl sulfonic acid (ATBS), monomers having a phosphonic acid function and salts thereof, cationic monomers are selected from the group consisting of dimethylaminoethyl acrylate (DMAEA) quaternized or salified; dimethylaminoethyl methacrylate (DMAEMA) quaternized or salified; diallyldimethyl ammonium chloride (DADMAC); acrylamidopropyltrimethylammonium chloride (APTAC); methacrylamidopropyltrimethylammonium chloride (MAPTAC).

3. The process for preparing water-soluble polymers in powder form according to claim 1 wherein the alkyl oleate of lubricant compositions LC1 and/or LC2, is selected from the group: methyl oleate, ethyl oleate, propyl oleate; isopropyl oleate, butyl oleate, isobutyl oleate, amyl oleate, and ethylhexyl oleate.

4. The process for preparing water-soluble polymers in powder form according to claim 1 wherein the polyoxyethylene group of the polyxoyethylene oleyl ether phosphate of lubricant compositions LC1 and/or LC2, contains between 2 and 50 oxyethylene moieties.

5. The process for preparing water-soluble polymers in powder form according to claim 1 wherein in step a) of the process 0.01 to 0.8 weight % of the lubricant composition LC1 is sprayed based on the weight of the polymerization charge.

6. The process for preparing water-soluble polymers in powder form according to claim 1 wherein in step d) of the process 0.01 to 1.2 weight % of the lubricant composition LC2 based on the weight of the polymerization charge is sprayed on the polymer in the cutting chamber of the granulator.

7. The process for preparing water-soluble polymers in powder form according to claim 2 wherein the water-soluble monoethylenically unsaturated monomers comprise anionic monomers selected from acrylic acid, acrylamide tertio butyl sulfonic acid (ATBS), and alkaline or alkaline earth or ammonium salts thereof.

8. The process for preparing water-soluble polymers in powder form according to claim 2 wherein the alkyl oleate of lubricant compositions LC1 and/or LC2, is selected form the group: methyl oleate, ethyl oleate, propyl oleate; isopropyl oleate, butyl oleate, isobutyl oleate, amyl oleate, ethylhexyl oleate.

9. The process for preparing water-soluble polymers in powder form according to claim 2 wherein the polyoxyethylene group of the polyxoyethylene oleyl ether phosphate of lubricant compositions LC1 and/or LC2, contains between 2 and 50 oxyethylene moieties.

10. The process for preparing water-soluble polymers in powder form according to claim 3 wherein the polyoxyethylene group of the polyxoyethylene oleyl ether phosphate of lubricant compositions LC1 and/or LC2, contains between 2 and 50 oxyethylene moieties.

11. The process for preparing water-soluble polymers in powder form according to claim 7 wherein the polyoxyethylene group of the polyxoyethylene oleyl ether phosphate of lubricant compositions LC1 and/or LC2, contains between 2 and 50 oxyethylene moieties.

12. The process for preparing water-soluble polymers in powder form according to claim 8 wherein the polyoxyethylene group of the polyxoyethylene oleyl ether phosphate of lubricant compositions LC1 and/or LC2, contains between 2 and 50 oxyethylene moieties.

13. The process for preparing water-soluble polymers in powder form according to claim 2 wherein in step a) of the process 0.01 to 0.8 weight % of the lubricant composition LC1 is sprayed based on the weight of the polymerization charge.

14. The process for preparing water-soluble polymers in powder form according to claim 3 wherein in step a) of the process 0.01 to 0.8 weight % of the lubricant composition LC1 is sprayed based on the weight of the polymerization charge.

15. The process for preparing water-soluble polymers in powder form according to claim 4 wherein in step a) of the process 0.01 to 0.8 weight % of the lubricant composition LC1 is sprayed based on the weight of the polymerization charge.

16. The process for preparing water-soluble polymers in powder form according to claim 7 wherein in step a) of the process 0.01 to 0.8 weight % of the lubricant composition LC1 is sprayed based on the weight of the polymerization charge.

17. The process for preparing water-soluble polymers in powder form according to claim 2 wherein in step d) of the process 0.01 to 1.2 weight % of the lubricant composition LC2 based on the weight of the polymerization charge is sprayed on the polymer in the cutting chamber of the granulator.

18. The process for preparing water-soluble polymers in powder form according to claim 3 wherein in step d) of the process 0.01 to 1.2 weight % of the lubricant composition LC2 based on the weight of the polymerization charge is sprayed on the polymer in the cutting chamber of the granulator.

19. The process for preparing water-soluble polymers in powder form according to claim 4 wherein in step d) of the process 0.01 to 1.2 weight % of the lubricant composition LC2 based on the weight of the polymerization charge is sprayed on the polymer in the cutting chamber of the granulator.

20. The process for preparing water-soluble polymers in powder form according to claim 5 wherein in step d) of the process 0.01 to 1.2 weight % of the lubricant composition LC2 based on the weight of the polymerization charge is sprayed on the polymer in the cutting chamber of the granulator.

* * * * *